United States Patent Office 3,551,155
Patented Dec. 29, 1970

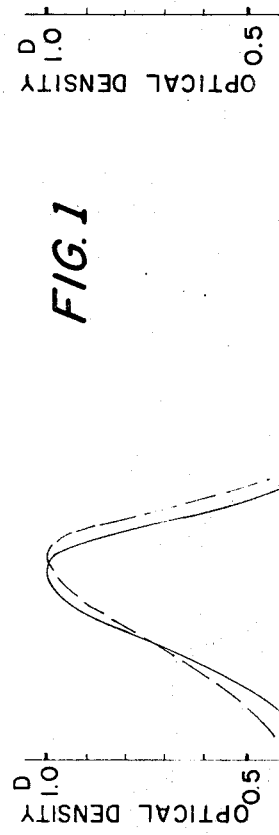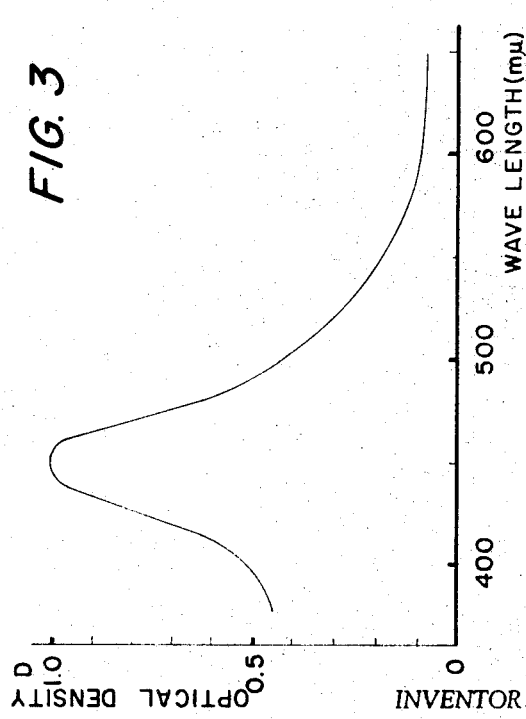

3,551,155
LIGHT SENSITIVE SILVER HALIDE MATERIALS CONTAINING YELLOW-FORMING COUPLERS
Makoto Yoshida, Momotoshi Tsuda, Kazuya Sano, and Yasushi Oishi, Ashigara-Kamigun, Kanagawa, Japan, assignors to Fuji Shashin Film Kabushiki Kaisha, Ashigara-Kamigun, Kanagawa, Japan, a corporation of Japan
Filed Jan. 23, 1967, Ser. No. 611,000
Claims priority, application Japan, Jan. 21, 1966, 41/3,236
Int. Cl. G03c 1/40
U.S. Cl. 96—100   10 Claims

ABSTRACT OF THE DISCLOSURE

The novel yellow-forming coupler having a methyl group on the benzoyl nucleus of a benzoyl acetanilide represented by

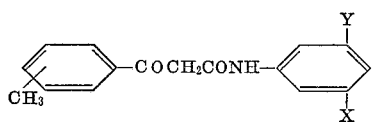

has been found to have a high coupling reactivity and a sufficient solubility in organic solvents as well as to give a yellow image of excellent fastness and a spectral absorption suitable for color photography.

BACKGROUND OF THE INVENTION

The following three methods have been hitherto known to incorporate a nondiffusing coupler in a photographic emulsion layer:

(1) Water-solution method; the neutral or alkaline aqueous solution of the coupler having the water-solubilizing group such as carboxyl group or sulfonic acid group, is added into the emulsion and the mixture neutralized with an acid, if needed.

(2) Oil-solution method; the coupler is dissolved in an organic solvent, dispersed into an aqueous medium to fine colloidal particles and then the dispersion is added into the emulsion.

(3) The melted coupler is added directly into the emulsion or aqueous medium.

In order to make up an excellent blue sensitive emulsion layer by use of a yellow-forming coupler of the oil-solution type, it is necessary that the coupler have a high coupling reactivity with the oxidation product of developing agent such as p-phenylene-diamines; that the yellow dye formed by color development have a light absorption suitable for the color reproduction; that the image of yellow dye can be stored without fading or deterioration even under severe conditions; and that the coupler have no bad influence upon the photographic emulsion. Furthermore the coupler must be easily dissolved in the organic medium used and must not crystallize during storage.

Since the commonly used coupler of the oil-solution type does not have high coupling reactivities against the exidation product of a developing agent in the dispersed state in the emulsion layer, a blue sensitive emulsion layer having excellent photographic characteristics has been difficultly obtained in such type. The change in the chemical structure of a yellow-forming coupler (such as a substituted benzoyl-acetanilide) as would impart high coupling reactivity to it, tends to shift the spectral absorption of the resulting yellow dye to the longer wave length, causing an increase in the absorption of unfavorable green light. That is to say, it has been believed that a general inconsistent correlationship exists between the desired light absorption of a yellow-forming coupler and its coupling reactivity.

In the field of color photography, therefore, a number of efforts have been made to obtain a yellow-forming coupler, having a high coupling reactivity and giving a yellow image without green absorption.

SUMMARY OF THE INVENTION

This invention relates to light sensitive materials having one or more emulsion layers containing dye-forming couplers and more particularly, it is concerned with the light sensitive materials wherein the novel yellow coupler is incorporated.

DESCRIPTION OF THE DRAWINGS

FIG. 1 relates to Example 1 and illustrates the spectral absorption curve of yellow image (Curve A) and that of another film provided and processed similarly using corresponding coupler having no $CH_3$ radical in benzene ring (Curve B).

FIG. 2 relates to Example 4 and illustrates the spectral absorption curve;

FIG. 3 relates to Example 6 and illustrates the spectral absorption curve; and

FIG. 4 relates to Example 12 and illustrates the spectral absorption curve.

DESCRIPTION OF THE PREFERRED EMBODIMENTS

In accordance with the present invention, there is provided a light sensitive material for color photography, containing at least one of the yellow-forming couplers represented by the general formula,

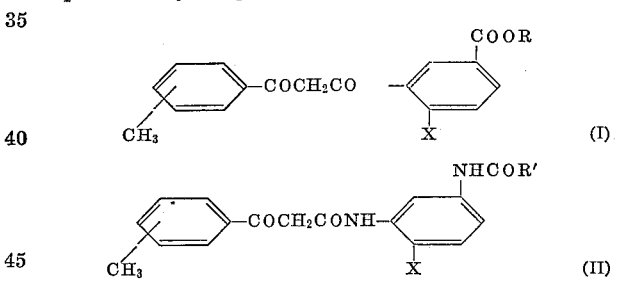

in which X is selected from the class consisting of alkoxyl group having 1 to 3 carbon atoms and halogen atom; R is selected from the class consisting of aliphatic residual group having at least one ether bond, branched alkyl group and straight chain alkyl group each having 8 to 20 carbon atoms, and —COR′ is an acyl group having 9 to 28 carbon atoms.

The above mentioned novel coupler used in this invention has a high coupling reactivity as well as a sufficient solubility in organic solvents, and it gives a yellow image of excellent fastness and spectral absorption suitable for color reproduction. The color photographic material produced by the use of this novel coupler is therefore characterized by good photographic properties, good color reproductivity, sufficient stability after the processings and ease of the production thereof. Such merits will be hereinafter illustrated in detail with other merits of this invention.

The new couplers of this invention, represented by the general Formulas I and II exhibit a similar or even higher coupling reactivity in comparison with the known couplers having the highest coupling reactivity as are represented by the following general Formulas III and IV. In addition the dyes formed from them exhibit much less green absorption undesirable from the standpoint of color reproduction of the subtractive process. Thus, a less reddish, sharp yellow can be obtained.

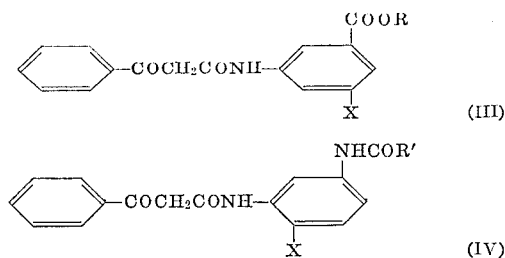

In each of these formulas, X, R and COR' have the same meaning in the general Formulas I and II. Therefore, the color photographic material of this invention, using the novel coupler, gives a high blue sensitivity, high yellow density and good gradation, while giving a less reddish, sharp hue.

The coupler of this invention is markedly soluble in an organic medium for emulsifying and dispersing it in emulsion. This property is shown in Table 1 with comparison with the known coupler.

TABLE 1

| Structure of coupler | | | | M.P. (° C.) | Solubility (25° C.) wt. percent/solution (ethyl acetate) |
|---|---|---|---|---|---|
| General formula | Position of —CH₃ | X | R or COR' | | |
| I | 2 | —OCH₃ | —(CH₂)₁₁CH₃ | 50–52 | More than 50. |
| I | 2 | —Cl | | 68 | 32. 5. |
| III | No | —OCH₃ | | 83–84 | 20. 4. |
| III | No | —Cl | | 97–99 | 6. 3 |
| II | 2 | —Cl | —COCH₂CH₂N—COC₁₅H₃₁ <br>   $\quad\quad\quad\quad\quad\quad$ \| <br>   $\quad\quad\quad\quad\quad\quad$ C₄H₉ | 97–98 | More than 32. |
| II | 4 | —Cl | | 111–112 | 9. 3. |
| IV | No | —Cl | | 100–101 | 4. 8. |

It is made possible by the use of the novel couplers of the general Formulas I and II each having a low melting point and high solubility to reduce the quantity of a solvent to be used and to disperse the coupler more finely in an aqueous medium. The use of the coupler which melts at less than 85° C., moreover, makes it possible to melt and then disperse the coupler directly in an aqueous medium without using an organic solvent, and the stability of the fine colloidal particles of the coupler can be improved. Such reduction of the quantity of a solvent for dispersion will apparently result in simplifying of the steps of producing a light sensitive material, increasing of the sharpness of an image by decreasing the thickness of a light sensitive layer, and shortening of the time for development.

The above mentioned effects and merits concerning the light absorption and solubility, obtained by introducing the methyl group into the benzoyl nucleus, are more strengthened in a case where the methyl group is introduced at the ortho-position to the carbonyl group. That is to say, the compound having methyl group at the ortho-position of the benzoyl nucleus in the general Formula I or II has more excellent properties as a coupler to be used in this invention.

Furthermore, a yellow image obtained from the novel coupler of this invention is so fast that it fades to much less extent even after a long preservation.

To the incorporation of the coupler of this invention into a photographic emulsion, various procedures can be satisfactorily applied, typical of which are the following:

(a) Dissolving the coupler in a less water-soluble, less volatile organic solvent (B.P., more than 200° C.) and dispersing the coupler solution directly in a photographic emulsion, or dispersing previously the same in an aqueous medium and then adding the dispersion to a photographic emulsion. Di-n-butyl phthalate, tricresyl phosphate and N,N-diethylcaproic acid amide are examples of such organic solvents.

(b) In the case of (a), a relatively water-insoluble, low boiling solvent is used, which is to be removed off during the later steps. Ethyl acetate and cyclohexanone are used as such a solvent.

(c) In the case of (a), a water-miscible organic solvent is used, which may be removed off during the later steps or may be retained in a photographic material. Illustrative of such organic solvent are dimethylformamide, dimethyl sulfoxide, N-methylpyrrolidone and glycerine.

(d) Heating and melting the coupler without using an organic solvent, and dispersing the thus melted coupler in an emulsion or aqueous medium directly. This is suitable for the coupler melting at less than 85° C.

In some case, the organic solvents as given in (a), (b) and (c) may be mixed to obtain a good dispersion of the coupler.

In order to make up a blue sensitive photographic emulsion layer having excellent properties, it does not matter whether only one of the couplers represented by the general Formulas I and II are used or two or more of them are used, or whether a yellow-forming coupler not represented by the general Formulas I and II are jointly used. As occasion demands, a yellow-forming coupler of water-soluble type may be jointly used in the same emulsion layer.

When a small amount of the coupler of this invention is used together with a cyan- or magenta-forming-coupler in the same emulsion layer, the color reproductivity can be improved, as disclosed in Japanese patent publication No. 391/1965.

The coupler of this invention can be satisfactorily applied to various color photographic materials, for example, color printing paper, color positive film, color negative film and color reversal film.

Our invention is applicable not only to color photographic materials of the so-called multi-layer type where two or more emulsion layers each containing spectrally sensitized silver halide and the corresponding nondiffusing coupler are superposed on one support, but also to the so-called mixed grain type material where two or more kinds of fine grains each containing spectrally sensitized silver halide and the corresponding nondiffusing coupler are mixed and coated on one support.

The yellow-forming coupler of this invention has been represented by the foregoing general Formula I or II, in which R of I is an aliphatic radical having at least one ether bond, branched or straight chain alkyl group, and these groups have 8–20 carbon atoms, and COR' of II is an acyl group of 9–28 carbon atoms. Those carrying less than the lower limit carbon atoms partly go into the alkaline developing solution and diffuse into other layers, resulting in worsening of the color reproductivity, since the aggregation force within the coupler molecules or between the coupler molecule and solvent molecule is insufficient. On the other hand, when the number of carbon atoms exceeds the upper limit in each case, the blue extinction per weight (i.e., volume) of the yellow dye formed becomes unfavourably too small for the emulsion layer to keep the blue density sufficient without increasing the thickness of the emulsion layer.

The typical examples of the couplers of this invention are as follows, but the invention is not to be limited thereby.

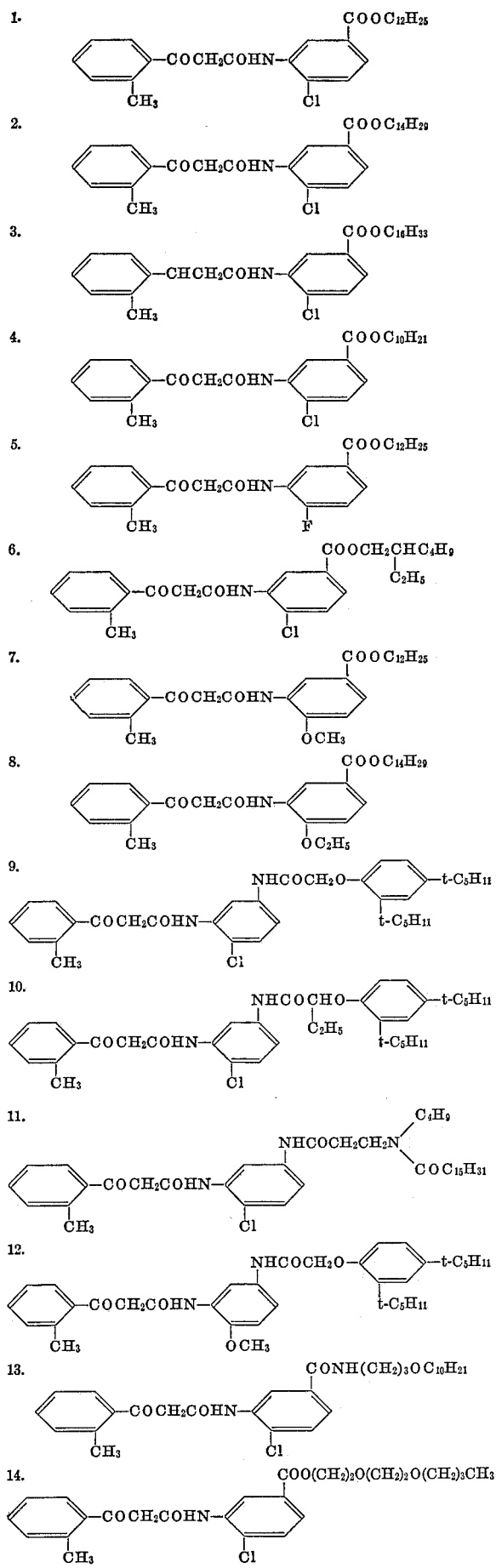
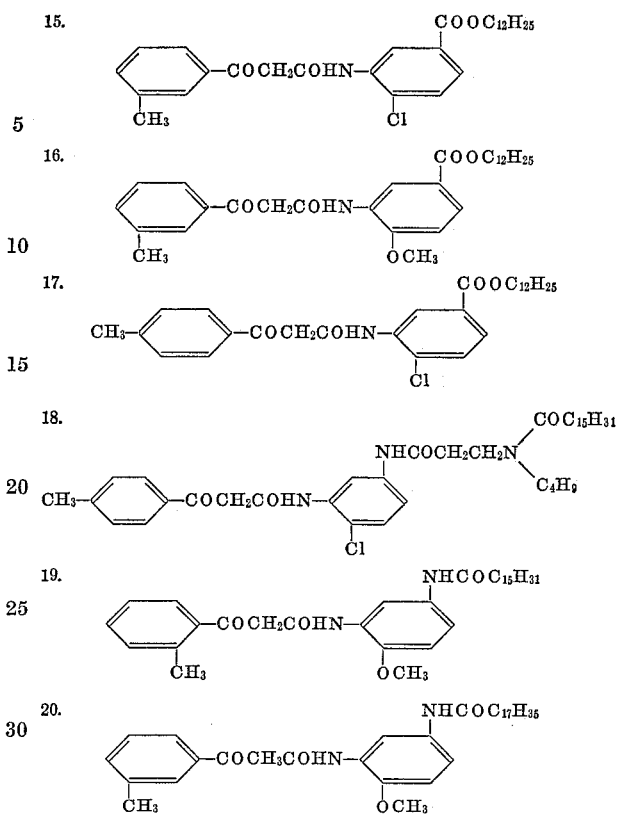

Examples of synthesizing some of these couplers will now be given.

SYNTHESIS EXAMPLE (1-a) Dodecyl-3-amino-4-chlorobenzoic acid

In a 1000 ml. 4-necked flask equipped with a stirrer, thermometer, nitrogen gas feed conduit and byproduced methanol discharge pipe were placed 185.5 g. of methyl-3-amino-4-chlorobenzoic acid (1 mol) and 279 g. of n-dodecyl alcohol (1.5 mols). The mixture was dissolved by heating at 80° C. with stirring, and then there were introduced 2.5 ml. of titanium butoxide and nitrogen gas to distill off methanol byproduced. When the heating was further continued to keep the internal temperature at 170–180° C., the ester exchange reaction gradually advanced and methanol started distilling off, about 80% of the theoretical amount methanol being distilled off within about 4 hours. Cooling the mixture gradually to the internal temperature of 40–50° C., it was withdrawn and added to 1000 ml. of methanol. After standing for one night, a brown crystal was obtained. It was filtered with suction, washed with 500 ml. of methanol and dried. It was then recrystallized by the use of 1500 ml. of methanol to give 285 g. of the object product melting at 60–62° C. in 79% yield.

(1-b) 2-methylbenzoylaceto-(2-chloro-5-dodecyloxycarbonyl)anilide (structural Formula 1)

In a 1000 ml. 3-necked flask equipped with a stirrer, thermometer and exhaust pipe of byproduced ethanol were placed 136 g. of acetol ethyl-o-methyl-benzoate (B.P. 105–107° C./1.5 mm. Hg) (0.66 mol) and 224 g. of dodecyl-3-amino-4-chlorobenzoic acid (0.66 mol) obtained in (1–a). When the content was heated with stirring at 140–150° C., ethanol started distilling off and about 60% of the theoretical amount ethanol was distilled off within about 4 hours. Stirring was stopped and ethanol was further distilled off under reduced pressure for 30 minutes. Cooling the reaction mixture gradually, it was withdrawn and added to 2500 ml. of petroleum ether. After standing for one night, a yellow-white crystal was deposited therefrom. It was filtered with suction, washed with 1000 ml. of petroleum ether and recrystallized from 1000 ml. of ligroin to give 156 g. of a white crystal melting at 68° C. in 47.2% yield.

SYNTHESIS EXAMPLE 2

(2-a) Dodecyl-3-amino-4-methoxybenzoic acid

A crystal was obtained in the similar manner to synthesis Example 1–a except that methyl-3-amino-4-methoxybenzoic acid was used in place of methyl-3-amino-4-chlorobenzoic acid, and recrystallized from methanol to yield the object product melting at 47–48° C. in 81% yield.

(2-b) 2-methylbenzoylaceto-(2-methoxy-5-dodecyloxycarbonyl)anilide (structural Formula 7)

In the synthesis Example 1–b, dodecyl-3-amino-4-methoxybenzoic acid was used in place of dodecyl-3-amino-4-chlorobenzoic acid. The resulting crystal was recrystallized from acetonitrile to obtain a white crystal melting at 46–48° C. in 43% yield.

SYNTHESIS EXAMPLE 3

2-methylbenzolyaceto-(2-chloro-5-(2,4-di-t-amyl-phenoxy-acetomido)anilide (structural Formula 9)

In a 100 ml. 3-necked flask equipped with a stirrer, dropping funnel and cooler were placed 50 g. of 2-methylbenzoylaceto-(3-chloro-5-amino)anilide, 20 g. of triethylamine and 300 ml. of acetone, to which 52 g. of 2,4-di-t-amylphenoxyacetyl chloride was then added dropwise at room temperature with stirring. After the stirring of about 30 minutes, about 150 ml. of the acetone was distilled off and the residual solution was poured in ice water. The resulting crystal was filtered, washed with water, dried and recrystalized from ethanol to obtain 52 g. (55% yield) of a white crystal melting at 137° C.

SYNTHESIS EXAMPLE 4

2-methylbenzoylaceto-(2-chloro - 5 - (3(N-butyl-hexadecaneamide) - propion - amido)anilide (structural Formula 11)

In synthesis Example 1 – b, 2 - chloro-5-(3-(N-butyl-hexadecaneamido)-propionamido)-aniline was used in place of dodecyl-3-amino-4-chlorobenzoic acid. The resulting oil was treated with acetonitrile to be crystallized and recrystallized from methanol to give a white crystal, the object compound. Yield: 85% M.P. 98–99° C.

SYNTHESIS EXAMPLE 5

3-methylbenzoylaceto-(2-methoxy-5-dodecyloxycarbonyl)anilide (structural Formula 16)

In synthesis Example 1 – b, acetol ethyl-m-methylbenzoate (B.P. 118–120° C./3 mm. Hg) was used in place of acetol ethyl-o-methylbenzoate, and dodecyl-3-amino-4-methoxybenzoic acid, in place of dodecyl-3-amino-4-chlorobenzoic acid. The resulting oil was treated with acetonitrile to be crystallized, and successively recrystallized from acetonitrile to give a white crystal. Yield: 42% M.P. 50–52° C.

SYNTHESIS EXAMPLE 6

4-methylbenzoylaceto-(2-chloro-5-dodecyloxycarbonyl)anilide (structural Formula 17)

In synthesis Example 1 – b, acetol ethyl-p-methylbenzoate (B.P. 128–129° C./2 mm. Hg) was used in place of acetol ethyl-o-methylbenzoate. The resulting crystal was recrystallized from acetonitrile to obtain a white crystal. Yield: 60% M.P. 124–125° C.

The melting point and nitrogen analysis are illustrated below concerning the typical couplers of this invention.

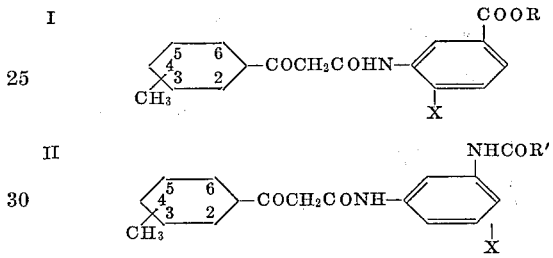

| General formula | Structural formula No. | Position of CH$_3$ radical | X | R | R' | M.P. °C. | N-analysis Calcd. | N-analysis found |
|---|---|---|---|---|---|---|---|---|
| I | 1 | 2 | —Cl | —C$_{12}$H$_{25}$ | — | 68 | 2.80 | 2.68 |
| | 2 | 2 | —Cl | —C$_{14}$H$_{29}$ | — | 69–70 | 2.66 | 2.55 |
| | 3 | 2 | —Cl | —C$_{16}$H$_{33}$ | — | 71 | 2.52 | 2.80 |
| | 7 | 2 | —OCH$_3$ | —C$_{12}$H$_{25}$ | — | 46–48 | 2.83 | 2.83 |
| | 15 | 3 | —Cl | —C$_{12}$H$_{25}$ | — | 81 | 2.80 | 2.83 |
| | 16 | 3 | —OCH$_3$ | —C$_{12}$H$_{25}$ | — | 50–52 | 2.83 | 3.07 |
| | 17 | 4 | —Cl | —C$_{12}$H$_{25}$ | — | 124–125 | 2.80 | 2.62 |
| II | 9 | 2 | —Cl | —CH$_2$O—C$_6$H$_3$(t-C$_5$H$_{11}$)(t-C$_5$H$_{11}$) | — | — | — | — |
| | | 2 | —Cl | —CH$_2$CH$_2$N(C$_4$H$_9$)COC$_{15}$H$_{31}$ | — | 137 | 4.86 | 4.86 |
| | 11 | 2 | —Cl | — | — | 98–99 | 6.29 | 6.27 |
| | 18 | 4 | —Cl | —CH$_2$CH$_2$N(C$_4$H$_9$)COC$_{15}$H$_{31}$ | — | 111–112 | 6.29 | 6.26 |

The following examples are given in order to illustrate the embodiments of this invention.

Example 1

15 g. of the coupler (1) and 20 g. of di-n-butyl phthalate were heated at 60° C. to prepare a coupler solution, which was then added to 300 ml. of an aqueous solution containing 25 g. of gelatin and 1.0 g. of sodium dodecylbenzenesulfonate at 60° C. and vigorously stirred for 30 minutes by means of a homogenizer. The coupler and di-n-butyl phthalate were finely emulsified. All the emulsified dispersion was mixed with 500 g. of a photographic emulsion containing 45 g. of silver iodobromide and 50 g. of gelatin, then with 30 ml. of a 3% acetone solution of triethylene phosphoramide as a hardener, and after the pH being adjusted to 7.0, applied to a film base of cellulose triacetate to be $8.0 \times 10^{-4}$ cm. thick on dry base.

The resulting film was exposed and processed according to the following procedures to obtain a sharp yellow image. The spectral absorption curve of the yellow image formed was shown by Curve A of FIG. 1. Similarly, Curve B of FIG. 1 was that of another film provided and processed similarly but using the corresponding coupler having no CH₃ radical in the benzene ring.

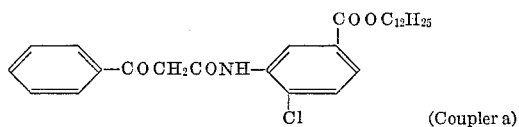

(Coupler a)

The coupler (1) gave a less reddish and sharper yellow than the coupler (a).

(I) Color developing treatments     Min.
  (1) Color developing—24° C. _____ 10
  (2) Rinsing—24° C. _____ 1
  (3) First fixing—24° C. _____ 4
  (4) Rinsing—24° C. _____ 33
  (5) Bleaching—24° C. _____ 3
  (6) Rinsing—24° C. _____ 2
  (7) Second fixing—24° C. _____ 3
  (8) Rinsing—18° C. _____ 10

(II) Color developing solution (pH=10.5)
  Water—1000 ml.
  4-amino-3-methyl - N,N - diethylaniline hydroxide—2.5 g.
  Sodium sulfite (anhydrous)—10 g.
  Sodium carbonate (monohydrate)—47 g.
  Potassium bromide—2 g.

(III) Fixing solution (pH=4.5)
  Water—1000 ml.
  Hypo (hexahydrate)—80 g.
  Sodium sulfite (anhydrous)—5 g.
  Borax—6 g.
  Acetic acid—4 ml.
  Potassium alum—7 g.

(IV) Bleaching bath (pH=7.2)
  Water—1000 ml.
  Potassium ferricyanide boric acid—10 g.
  Borax—5 g.

EXAMPLE 2

15 g. of the coupler (1) was heated and melted at 80° C., added to 250 ml. of an aqueous solution containing 30 g. of gelatin and 1.5 g. of sodium dodecylbenzenesulfonate at 75° C. and the mixture was then finely dispersed by means of a colloid mill previously heated to above 80° C. by hot water.

All the coupler emulsion was added to 500 g. of an emulsion and applied to a film base similarly to Example 1. The resulting film was exposed and developed similarly to Example 1 to give a sharp yellow image.

EXAMPLE 3

15 g. of the coupler (1) was added to 25 ml. of ethyl acetate and dissolved therein with heating. The resulting solution was added to 250 ml. of an aqueous solution containing 30 g. of gelatin and 1.5 g. of sodium dodecylbenzenesulfonate, vigorously mechanically stirred in a homoblender and emulsified within 20 minutes.

All of the so obtained coupler emulsion was added to 300 g. of a photographic emulsion containing 30 g. of silver chlorobromide and 50 g. of gelatin, to which 20 ml. of a 3% acetone solution of triethylene phosphoramide as a hardening agent was then added, and the pH was adjusted. The resulting emulsion was superposed as a fourth layer on a multi-layer film having a red sensitive emulsion containing the coupler (b) as a first layer, green sensitive emulsion containing the coupler (c) as a second layer and yellow colloidal silver as a third layer, and dried to provide a positive film for color photography.

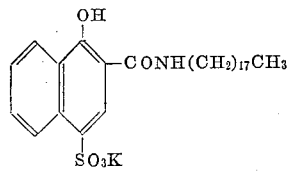

(Coupler (b))

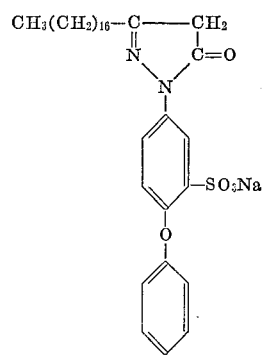

(Coupler (b))

When the film was subjected to stepwise exposure to blue light by the use of a sensitometer and to the developing treatments similar to Example 1, a sharp yellow image was obtained having a maximum density, gradation and sensitivity such as being required for color positive films.

EXAMPLE 4

5 g. of coupler (7) and 5 g. of di-n-butyl phthalate were heated at 60° C. to prepare a solution, which was then added to 50 ml. of an aqueous solution containing 5 g. of gelatin and 0.3 g. of sodium dodecylbenzenesulfonate and vigorously stirred by means of a high velocity agitator.

All the resulting coupler emulsion was added to 200 g. of a photographic emulsion containing 15 g. of silver iodobromide and 20 g. of gelatin, to which 10 ml. of a 3% acetone solution of triethylene phosphoramide was then added as a hardener, and applied to a film base of cellulose triacetate, followed by drying.

The so obtained film was subjected to stepwise exposure by the use of a sensitometer, developed at 24° C. for 6 minutes by the following developing solution and rinsed with water at the same temperature. Then, it was exposed uniformly to white light and color developed as described in Example 1. The thus processed film gave a clear yellow image having such a maximum density, gradation and sensitivity as required for color reversal films. The spectral absorption curve of the resulting color image was shown in FIG. 2.

(V) Black-and-white developing solution (pH=10.8)
  Water—1000 ml.
  Metol—1 g.
  Hydroquinone—3 g.
  Sodium sulfite (anhydrous)—50 g.
  Sodium carbonate (monohydrate)—25 g.
  Potassium rhodanate—3.6 g.
  Potassium bromide—2 g.

EXAMPLE 5

The following two films were subjected to developing treatments similar to Example 1.
  (A) Film of Example 1.
  (B) To 500 g. of a photographic emulsion containing 45 g. of silver iodobromide and 50 g. of gelatin were added a solution of the coupler (d) represented below, 15 g. of the coupler being dissolved in 15 ml. of methanol, 50 ml. of 1 N caustic soda solution and 100 ml. of distilled water, 90 ml. of a 3% saponin solution, 10% citric acid solution in an amount sufficient to adjust the pH of the emulsion to 6.5 and 200 ml. of water with stirring, and the resulting emulsion was applied to a film base of cellulose triacetate, followed by drying.

These two films A, B were allowed to stand in an air bath kept at 65° C. and 75% R.H. and the lowering of the yellow density was measured about them.

TABLE 3.—FADING OF YELLOW IMAGE DUE TO HEAT AND HUMIDITY (PERCENT, RATIO OF LOWERING OF COLOR DENSITY)

| Coupler | Time (day) | | | |
| --- | --- | --- | --- | --- |
| | 0 | 5 | 10 | 20 |
| Film: | | | | |
| A | 1 | 0 | 2 | 3 | 4 |
| B | d | 0 | 15 | 35 | 65 |

It is evident from the fact that the color image obtained from the coupler (1) is more stable and more fast to heat and humidity than that obtained from the coupler (d).

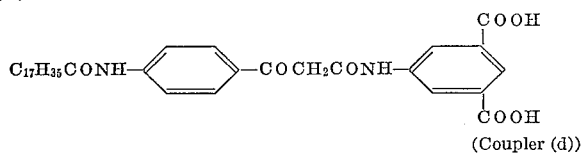

(Coupler (d))

EXAMPLE 6

3 g. of coupler (9) was dissolved in 1.5 ml. of tricresyl phosphate and 6 ml. of cyclohexanone with heating. The hot solution of the coupler was added to 50 ml. of a 10% aqueous gelatin solution containing 0.3 g. of sodium higher alkylnaphthalenesulfonate and finely dispersed by a strong mechanical stirring.

The thus resulting coupler dispersion was added to 140 g. of a blue sensitive photographic emulsion containing 7.8 g. of silver chlorobromide and 9.0 g. of gelatin, to which 5 ml. of a 3% acetone solution of triethylene phosphoramide was then added as a hardener, and the emulsion was applied to a film base of cellulose triacetate to be $6 \times 10^{-4}$ cm. thick on dry base, followed by drying.

When the film was subjected to stepwise exposure by the use of a sensitometer and processed as described in Example 1, a color image was obtained having such a maximum density, gradation and sensitivity as being required for color positive films (see FIG. 3).

EXAMPLE 7

5 g. of the coupler (1) and 5 g. of the coupler (7) were heated with 5 g. of di-n-butyl phthalate to prepare a hot solution. The resulting hot solution of the couplers was added to 100 ml. of a 10% aqueous gelatin solution containing 0.5 g. of sodium higher alkylnaphthalenesulfonate and the mixture was vigorously mechanically stirred in a homogenizer, thereby to disperse finely the couplers and phthalate in gelatin.

All the coupler dispersion was added to 540 g. of a blue sensitive photographic emulsion containing 30 g. of silver chlorobromide and 35 g. of gelatin, to which 30 ml. of 3% acetone solution of triethylene phosphoramide as a hardener and 7 g. of polyvinylpyrrolidone were then added, and the resulting emulsion was applied to a baryta paper for the printing paper as a first layer to be $4.0 \times 10^{-4}$ cm. thick on dry base. Successively, a green sensitive emulsion containing a dispersion of the following coupler (e) was superposed thereon as a second layer,

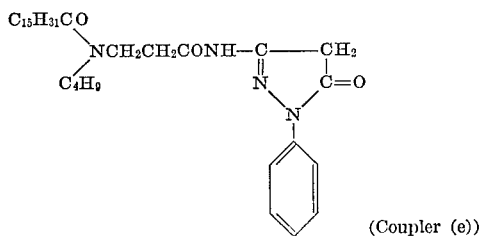

(Coupler (e))

and a red sensitive emulsion containing a dispersion of the coupler (f), as a third layer, followed by drying.

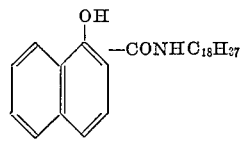

(Coupler (f))

The so obtained printing paper for color photography was subjected to stepwise exposure to blue light by means of a sensitometer and then processed similarly to Example 1 except that it was developed at 20° C. for 12 minutes by the use of the following developing solution.

(VI) Color developing solution B
 Water—1000 ml.
 N-hydroxyethyl-N-ethyl-p-phenylenediamine sulfate—4.5 g.
 Potassium carbonate—75 g.
 Potassium bromide—2.5 g.
 Sodium sulfite (anhydrous)—2 g.
 Potassium phosphate (tribasic)—10 g.
 Hydroxylamine hydrochloride—2 g.

A clear yellow image obtained exhibited such a maximum density, gradation and sensitivity as being required for color printing papers. When the printing paper was exposed through a color negative film and developed as mentioned above, a clear color print was obtained.

EXAMPLE 8

10 g. of the coupler (3) and 5 g. of di-n-butyl phthalate were heated to prepare a solution. The resulting hot solution of the coupler was added to 70 ml. of a 10% aqueous gelatin solution containing 1.0 g. of sodium higher alkylnaphthalenesulfonate and vigorously mechanically stirred in a homoblender thereby to disperse finely the coupler and phthalate in gelatin.

All the coupler dispersions was added to 500 g. of a blue sensitive photographic emulsion containing 26.6 g. of silver iodobromide and 40 g. of gelatin, to which 100 ml. of a 3% acetone solution of triethylene phosphoramide was then added as a hardening agent, and coated on a film base of cellulose triacetate to be 4.0 microns in thickness on dry base, followed by drying.

The resulting film was subjected to stepwise exposure to blue light by means of a sensitometer and processed in the similar manner to Example 1 except that it was developed at 20° C. for 15 minutes by the use of the color developing solution (B).

A yellow image obtained exhibited such a maximum density, gradation and sensitivity as required for color negative films.

EXAMPLE 9

The following two films were exposed and developed similarly to Example 1.

(A) Film of Example 6.

(B) A light sensitive film was prepared in the similar manner to Example 6 except that in place of the coupler dispersion, a solution of 3.2 g. of the coupler (d) dissolved in 3.2 ml. of methanol, 10.7 ml. of 1 N caustic soda solution and 21 ml. of distilled water was added and then neutralized with citric acid to pH 6.5.

The developed two color films were exposed to a very strong light from a xenon lamp for 20 hours respectively and the lowering of color density of yellow was measured.

FADING OF YELLOW IMAGE DUE TO LIGHT (PERCENT, RATIO OF LOWERING OF COLOR DENSITY)

| Coupler | Initial density | |
| --- | --- | --- |
| | 1.0 | 2.0 |
| Film: | | |
| A | 3 | 25 | 15 |
| B | d | 65 | 45 |

As evident from the results, the film using the coupler (3) of this invention gave a less degree of fading due to light than the film using the known coupler (d), the former being more fast to light than the latter.

EXAMPLE 10

15 g. of the coupler (15), 20 g. of di-n-butyl phthalate and 30 ml. of cyclohexanone were heated at 60° C. to prepare a hot solution, which was then added to 300 ml. of an aqueous solution containing 25 g. of gelatin and 1 g. of sodium dodecylbenzen-sulfonate at 60° C. and vigorously mechanically stirred in a homogenizer for 30 minutes. The coupler was finely emulsified with the solvent.

All the emulsified dispersion was mixed with 500 g. of a photographic emulsion containing 45 g. of silver iodobromide and 50 g. of gelatin, to which 30 ml. of a 3% of triethylene phosphoramide was then added as a hardener, and after the pH adjusted to 7.0, the resulting emulsion was applied to a film base of cellulose triacetate to be $8.0 \times 10^{-4}$ cm. thick on dry base. The film was exposed and processed as in Example 1 to give a clear yellow image.

EXAMPLE 11

A sharp yellow image was obtained in the similar manner to Example 10 except that the coupler (17) was used in place of the coupler (15) used in Example 10.

EXAMPLE 12

15 g. of the coupler (18), 20 g. of di-n-butyl phthalate and 30 ml. of ethyl acetate were heated to prepare a solution, which was then added to 300 ml. of an aqueous solution containing 25 g. of gelatin and 1 g. of sodium dodecylbenzenesulfonate and vigorously mechanically stirred for 30 minutes by means of a homogenizer. The coupler was finely emulsified with the solvent.

All the emulsified dispersion was mixed with 500 g. of photographic emulsion containing 45 g. of silver iodobromide and 50 g. of gelatin, to which 30 ml. of a 3% aqueous solution of triethylene phosphoramide was then added as a hardening agent, and after the pH being adjusted to 7.0, the resulting emulsion was applied to a film base of cellulose triacetate to be $8.0 \times 10^{-4}$ cm. thick on dry base.

The thus resulting film was exposed and processed as in Example 1 to obtain a sharp yellow image. The spectral absorption curve of the yellow image color formed was shown in FIG. 4.

EXAMPLE 13

The coupler (11) was dispersed to an emulsion and applied to a film base as in Example 12.

The resulting film was exposed and processed as described in Example 1 to give a less reddish clear yellow image.

We claim:

1. A light-sensitive material for color photography, comprising a support bearing thereon a silver halide emulsion layer containing at least one yellow-forming coupler represented by the general formula

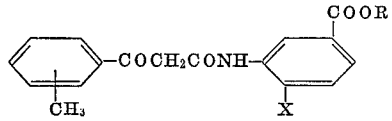

wherein X represents a member selected from the group consisting of a halogen atom and a lower alkoxy group of 1–3 carbon atoms, and R represents a radical containing 8 to 20 carbon atoms which is selected from the group consisting of an alkyl group and a radical represented by the formula $$-(CH_2)_n-O-[(CH_2)_m-O-]_{p-1}R'$$

in which R' represents an alkyl group, $m$ and $n$ each is an integer of from 2 to 5 inclusive, and $p$ is an integer of from 1 to 2 inclusive.

2. A light-sensitive material for color photography comprising a support bearing thereon a silver halide emulsion layer containing a yellow-forming coupler selected from the group consisting of α-2-methylbenzoylaceto-2'-halo-5'-alkoxycarbonylanilide and α-2 - methylbenzoylaceto-2'-(lower alkoxy) - 5' - alkoxycarbonylanilide, in which said alkoxycarbonyl group contains 9 to 21 carbon atoms.

3. A light-sensitive material for color photography comprising a support bearing thereon a silver halide emulsion layer containing at least one yellow-forming coupler represented by the general formula

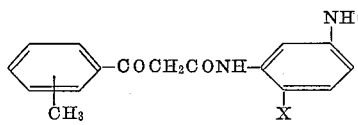

wherein X represents a member selected from the group consisting of a halogen atom and a lower alkoxy group of 1–3 carbon atoms and —COR″ represents an acyl group containing 9 to 28 carbon atoms.

4. A light-sensitive material for color photography comprising a support bearing thereon a silver halide emulsion layer containing a yellow-forming coupler selected from the group consisting of α-2-methylbenzoylaceto-2'-halo-5'-acylaminoanilide and α-2 - methylbenzoylaceto-2'(lower alkoxy) - 5' - acylaminoanilide, in which said acylamino group contains 9 to 28 carbon atoms.

5. A light-sensitive material as claimed in claim 2, in which said yellow-forming coupler is α-2-methylbenzoylaceto-2'-chloro-5'-dodecyloxycarbonylanilide.

6. A light-sensitive material as claimed in claim 2, in which said yellow-forming coupler is α-2-methylbenzoylaceto-2'-methoxy-5'-dodecyloxycarbonylanilide.

7. A light-sensitive material as claimed in claim 1, in which said yellow-forming coupler is α-3-methylbenzoylaceto-2'-methoxy-5'-dodecyloxycarbonylanilide.

8. A light-sensitive material as claimed in claim 1, in which said yellow-forming coupler is α-4-methylbenzoylaceto-2'-chloro-5'-dodecyloxycarbonylanilide.

9. A light-sensitive material as claimed in claim 4, in which said yellow-forming coupler is α-2-methylbenzoylaceto - 2' - chloro-5'-[3″-(N-n-butylhexadecaneamido)-propionamido-anilide.

10. A light-sensitive material as claimed in claim 4, in which said yellow-forming coupler is α-2-methylbenzoylaceto - 2' - chloro-5'-(2″,4″-di-tert-amylphenoxyacetamido)-anilide.

References Cited

UNITED STATES PATENTS 2,407,210  9/1946  Weissberger et al. _____ 96—100
3,409,439  11/1968  Yoshida et al. _____ 96—100

OTHER REFERENCES

Brown et al., Journal American Chemical Society, vol. 79, pp. 2919-27, (1957).

J. TRAVIS BROWN, Primary Examiner

U.S. Cl. X.R.

96—55, 74